COMPOSITIONS,
COATING OR PLASTIC
106/86

Patented Dec. 5, 1944

2,364,344

UNITED STATES PATENT OFFICE 2,364,344

INSULATING COMPOUND

Robert Connell and Samuel I. Wilson,
Portland, Oreg.

No Drawing. Application November 23, 1942,
Serial No. 466,666

4 Claims. (Cl. 106—86)

The invention relates to an insulating composition and process of producing the same, the primary object of the invention being to provide a composition of this type which sets quickly, has unusual strength, is light in weight, resistant to cracking when hammered, and substantially fireproof.

Another important object of the invention is to provide material of the character indicated from which can be readily formed into sheets, plates or coatings for such uses as roof insulation, pipe covering, sound insulation, cold storage board, plaster, stucco, paint for masonry walls and stucco work, camouflage work, partition tile, and insulating brick.

Other important objects and advantages of the invention will be apparent from a reading of the following description and the examples given therein for illustrative purposes.

The invention contemplates a paste of an active composition for addition to Portland cement, lime, or hydrated lime at the time of mixing, the composition or paste consisting substantially of

| Ammonium alum sulphate, $(NH_4)_2SO_4Al_2(SO_4)_2 24H_2O$ | ounce | 1 |
|---|---|---|
| Corn starch | do | 1 |
| Concentrated ammonium stearate (weighing about 8 pounds to the gallon) | gallon | 1 |

In forming the above composition the sulphate and corn starch are added to the stearate paste. The result is a paste. Calcium stearate can be used instead of ammonium stearate.

In mixing the active composition or paste with a 94 lb. sack of Portland cement, 0.60 of a pound of the paste is diluted with about 1 gallon of water at the time of mixing the cement for the production of an aggregate. The same amount of composition is used in the cases of hydrated lime and quicklime, except that in the case of quicklime the addition is not made on any account until the quicklime is to be used for mortar (lime and cement).

A preferred insulating composition in accordance with the present invention contains the following ingredients in the proportions set forth:

| Portland cement | parts by volume | 1 |
|---|---|---|
| Light aggregate, such as vermiculite or the like, according to the density of the mix desired | parts by volume | 1 to 12 |
| The active composition for each 94 pound sack of Portland cement employed | pound | 0.60 |
| Clean cold water to each 94 pound sack of Portland cement used, according to the percentage of aggregate used with respect to the amount of Portland cement | gallons | 7 to 14 |

The resultant of the above mixture is a quick-setting, foaming, easy working mix which when set is light in weight and waterproof.

It will be understood that it is not desired to limit the invention to the specific aspects herein disclosed, except as may be required by the subjoined claims.

Having described the invention, what is claimed as new is:

1. An active insulating composition comprising a paste and a strong light-weight and fireproof mortar body in approximate proportions of 0.6 pound of said paste to 94 pounds of Portland cement, said paste consisting of about 1 gallon of ammonium stearate, 1 ounce of corn starch, and 1 ounce of ammonium alum sulphate, said mortar body consisting of about 94 pounds of Portland cement, and a vermiculite aggregate of up to 12 volumes to one volume of the Portland cement, and 7 to 14 gallons of water.

2. An active composition for producing a quick-setting, foaming, easy-working mix for the production of a strong light-weight and fireproof mortar body, said composition consisting of the resultant of a mixture of ammonium stearate paste, corn starch, and ammonium alum sulphate and an element selected from the group consisting of Portland cement, lime and hydrated lime, the proportions being about 94 pounds of said element and 0.60 pound of said paste in 1 gallon of water, said paste consisting of about 8 pounds of concentrated ammonium stearate paste to one ounce each of said starch and sulphate.

3. An active composition for producing a quick-setting, foaming, easy-working mix for the production of a strong light-weight and fireproof mortar body, said composition consisting of the resultant of a mixture of ammonium stearate paste, corn starch, and ammonium alum sulphate, and an element selected from the group consisting of Portland cement, lime and hydrated lime, the proportions being about 94 pounds of said element and 0.60 pound of said paste in 1 gallon of water, said paste consisting of about 8 pounds of concentrated calcium stearate paste to one ounce each of said starch and sulphate.

4. An active composition for producing a quick-setting, foaming, easy-working mix for the production of a strong, light-weight and fire-proof mortar body, said composition consisting of the resultant of a mixture of a stearate selected from the group consisting of concentrated ammonium stearate paste and concentrated calcium stearate paste, corn starch and ammonium alum sulphate, and an element selected from the group consisting of Portland cement, lime and hydrated lime, the proportions being about 94 pounds of said element, 0.60 pound of said paste in a gallon of water, the sulphate and the corn starch being present in the proportions of 1 ounce of sulphate and 1 ounce of corn starch to each gallon of stearate paste.

ROBERT CONNELL.
SAMUEL I. WILSON.